(12) United States Patent
Huang

(10) Patent No.: US 7,093,367 B1
(45) Date of Patent: Aug. 22, 2006

(54) ANGULAR ADJUSTMENT DEVICE IN THE HANDLE OF A HANDSAW

(76) Inventor: Yin-Hae Huang, P.O. Box 697, Fongyuan City, Taichung County (TW) 420

( * ) Notice: Subject to any disclaimer, the term of this patent is extended or adjusted under 35 U.S.C. 154(b) by 15 days.

(21) Appl. No.: 10/946,001

(22) Filed: Sep. 22, 2004

(51) Int. Cl.
*B23D 51/01* (2006.01)
*B26B 1/04* (2006.01)

(52) U.S. Cl. .............................. 30/519; 30/161; 30/517

(58) Field of Classification Search .................. 30/329, 30/330, 331, 514, 517, 519, 161; D8/97, D8/95
See application file for complete search history.

(56) References Cited

U.S. PATENT DOCUMENTS

| | | | | |
|---|---|---|---|---|
| 4,918,820 A | * | 4/1990 | Korb et al. | ..... 30/161 |
| 5,661,908 A | * | 9/1997 | Chen | ..... 30/125 |
| D411,429 S | * | 6/1999 | Gringer | ..... D8/95 |
| 5,979,065 A | * | 11/1999 | Hsu | ..... 30/519 |
| 6,789,326 B1 | * | 9/2004 | Huang | ..... 30/517 |

* cited by examiner

*Primary Examiner*—Hwei-Siu Payer

(57) ABSTRACT

A handsaw includes a handle combined with a first and a second halves each having a large circular hole in front end wherein the first half has a protrudent ring together with a plurality of positioning grooves in the inner periphery of the large circular hole and an elongate receiving space in inner surface and the second corresponding half has inner threads in the large circular hole, an angular adjustment device disposed in the front end of the handle between the large circular holes and composed of a turning member, a circular clamping plate biased by a spring, a saw blade having an inner end secured to a retaining rod and a rectangular protrusion on the other side of the clamping plate and a cup-shaped fastener stopping against the circular clamping plate and the saw blade through the large circular hole of the second half.

3 Claims, 11 Drawing Sheets

ANGULAR ADJUSTMENT DEVICE IN THE HANDLE OF A HANDSAW

BACKGROUND OF THE INVENTION

The present invention relates to cutting apparatus and more particularly to an angular adjustment device in the handle of a handsaw. The adjustment device is of a multi-stepped type which enables the saw blade to be bent to different angles relative to the handle and hid in the handle when not in use.

The prior art handsaw or artistic knife is of the type that the saw blade is fixed to one end of the handle and/or bent over to place into a lateral side of the handle and the blade of the artistic knife is slidably stretching out and/or contracting into the handle. These types of handsaw and artistic knife can not perform the angular adjustment for their blades. So they are difficult to cut an angled working object. If a handsaw and/or an artistic knife can be able to adjust their blade angle and the assembly or disassembly of the blade is rapid as well as the blade is able to hide into the handle that will bring a great convenience to the users.

Although a blade angle adjustable artistic knife is now available in the market and welcomed by most of the users. But this type of artistic knife adopts a rotatable head on the front end of the handle to fix the inner end of a blade. So that the adjustment of the blade angle is conducted by indirectly rotating the head. Nevertheless, this type of artistic knife is structurally complicated. Which is unsuitable to a handsaw because the saw blade is too long to be contracted into the head but bent over to place into the handle.

SUMMARY OF THE PRESENT INVENTION

The present invention has a main object to provide an angular adjustment device in the handle of a handsaw which device is of a multi-stepped type into which the saw blade is fixed and can be adjusted to different angles to fit the requirement of the users.

Another object of the present invention is to provide an angular adjustment device in the handle of a handsaw in which the saw blade may be bent over to hide into the handle.

Further object of the present invention is to provide an angular adjustment device in the handle of a handsaw which has a simple structure facilitating to rapid assembly and/or disassembly.

Further object of the present invention is to provide an angular adjustment device in the handle of a handsaw which device is structurally suitable to different cutting apparatus.

Accordingly, the angular adjustment device in the handle of a handsaw of the present invention comprises generally a handle which is combined by a first and a second corresponding halves each having a large circular hole adjacent front end engaged with each other. The large circular hole of the first corresponding half including a protrudent ring and several positioning grooves in inner periphery and a receiving space formed in the inner side thereof. A turning member engages into the large circular hole of the first corresponding half including a circular ring on an outer periphery, a pressing cap on inner end and a detent on a lateral side. A spring disposes into the turning member and stops against a circular clamping plate which has circumferential stripes, a circular concave in inner end for engaging with the spring, a retaining groove around the concave, a horizontal groove in outer surface in which is a retaining rod and a rectangular protrusion for engaging the rear end of a saw blade. The large circular hole of the second corresponding half has inner threads engaged with the outer threads of a cylindrical fastener which is functioned to stop against the circular clamping plate and the saw blade or the blade of an artistic knife. When presses the pressing cap, the angular adjustment device is rotatable to steppedly change the angle of the saw blade.

The present invention will become more fully understood by reference to the following detailed description thereof when read in conjunction with the attached drawings.

DETAILED DESCRIPTION OF THE PREFERRED EMBODIMENT

Figure 1:
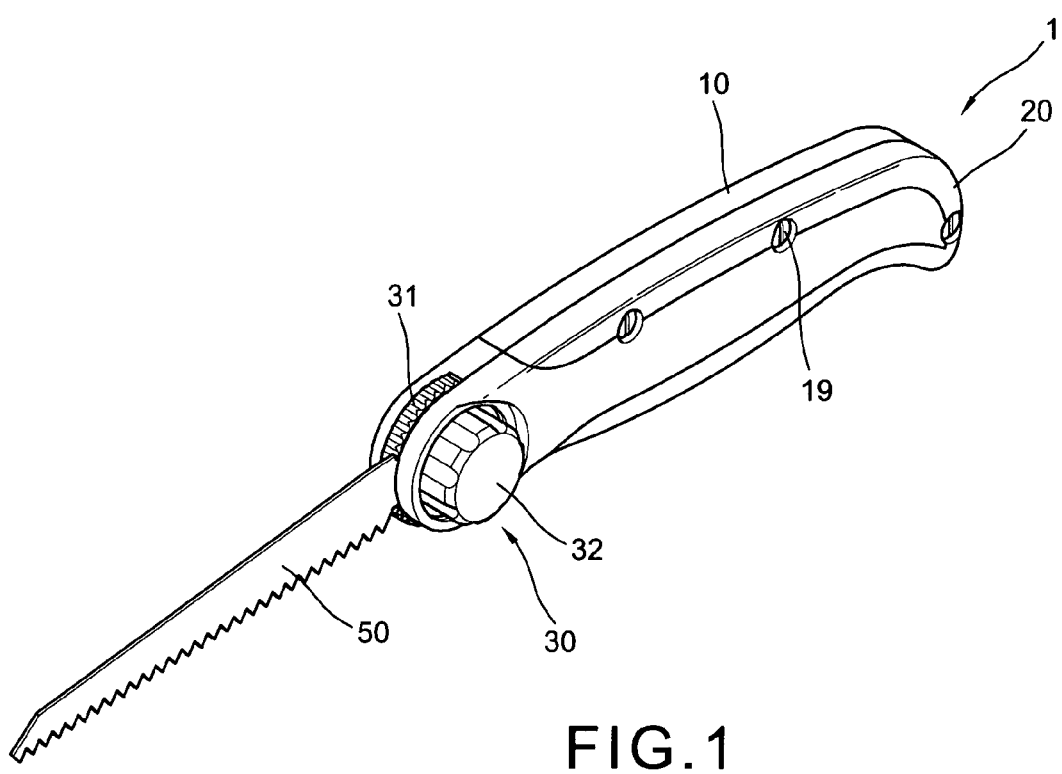
FIG. 1 is a perspective view of the handsaw of the preferred embodiment of the present invention.
Figure 2:
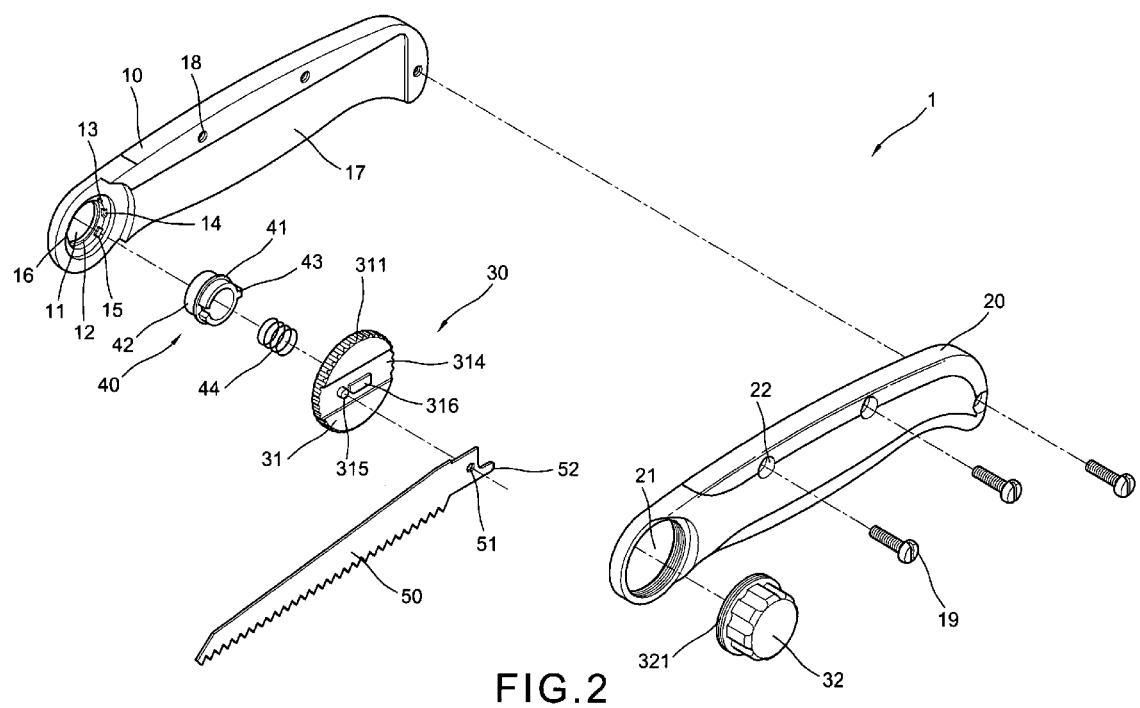
FIG. 2 is an exploded perspective view of FIG. 1.
Figure 3:
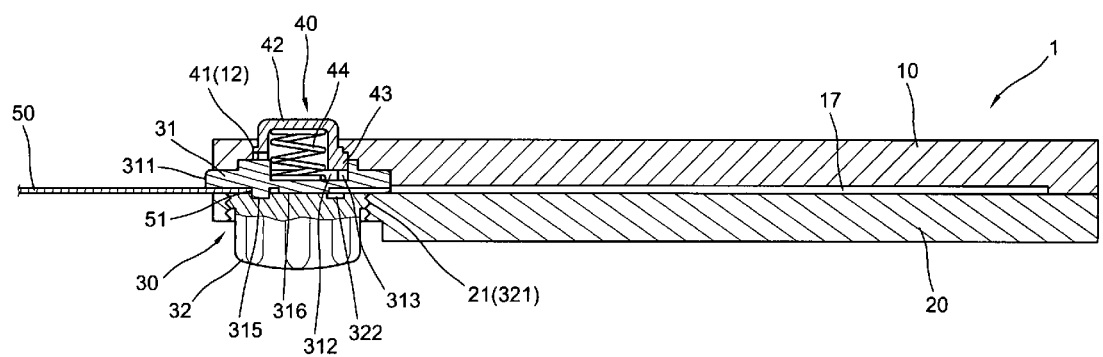
FIG. 3 is a sectional view of FIG. 1.

With reference to the drawings and initiated from FIGS. 1, 2 and 3, the angular adjustment device in the handle of a handsaw of the present invention comprises a handle 1 which is combined with a first and second corresponding halves 10 and 20 and fastened by three screws 19 through the three through holes 22 and three screw holes 18 in the two corresponding halves 10 and 20. The first corresponding half 10 has a first large circular hole 11 in front end which includes a protrudent ring 12 and four positioning grooves 13, 14, 15 and 16 spacedly formed in inner periphery, wherein the positioning grooves 13, 14 and 15 are positioned in the right side and the positioning groove 16 is positioned in the left side and an elongate receiving space in inner side of the body. The second corresponding half 20 has a second large circular hole 21 in front end engaged with the first large circular hole 11 and threads on inner periphery. The angular adjustment device is composed of a hollow turning member 40 which includes a protrudent ring 41 on an outer periphery engaged with the protrudent ring 12, a pressing cap 42 on bottom and a detent 43 on an outer periphery abutting the rim thereof which can be able to selectively engage with any one of the four positioning grooves 13, 14, 15 and 16. A spring 44 has one end anchored in the rim of the turning member 40 and the other end stopped against the inner side of a circular clamping plate 30 which has a striped circumference 311, a circular concave 312 in the center of the inner side engaged with the spring 44, a circular groove 313 around the circular concave 312 to engage with the inner rim of the turning member 40, a diametric groove 314 horizontally formed in the outer side in which is a retaining rod 315 adjacent a rectangular protrusion 316 which are provided to securing the inner end of a saw blade 50 which has a through hole 51 wrapped onto the retaining rod 315 and an extension 52 engaged with the underside of the rectangular protrusion 316. A cup-shaped fastener 32 has threads 321 on outer periphery abutting inner end engaged with the inner threads of the second large circular hole 21 of the second corresponding half 20 and pressed against the circular clamping plate 30 and the saw blade 50. The fastener 32 further has a circular groove 322 in an inner surface engaged with the retaining rod 315.

When assemble the saw blade, slightly loosen the fastener 32 and insert the inner end of the saw blade into the groove 314 to have the through hole 51 wrapped onto the retaining rod 315 and the extension 52 reached to the underside of rectangular protrusion 316. Then fasten the fastener 32 again, the saw blade is therefore fixed up (as shown in FIGS. 3 and 4).

Figure 5:
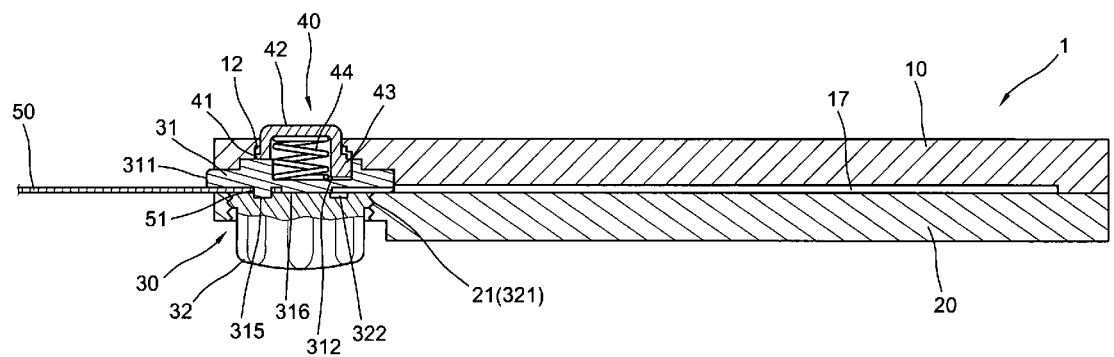
FIG. 5 is a sectional view to show that the pressing cap is pressed inward.
Figure 6:
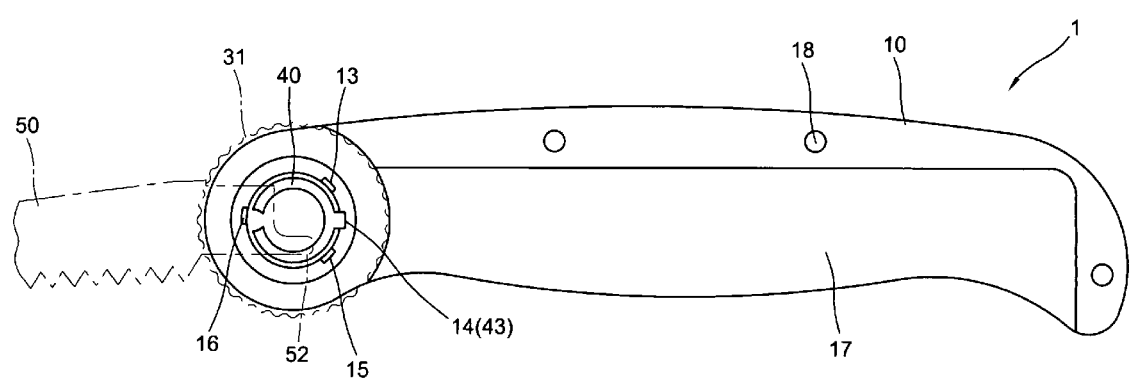
FIG. 6 is a plane view to show that the turning member is positioned in place in the large circular hole.
Figure 7:
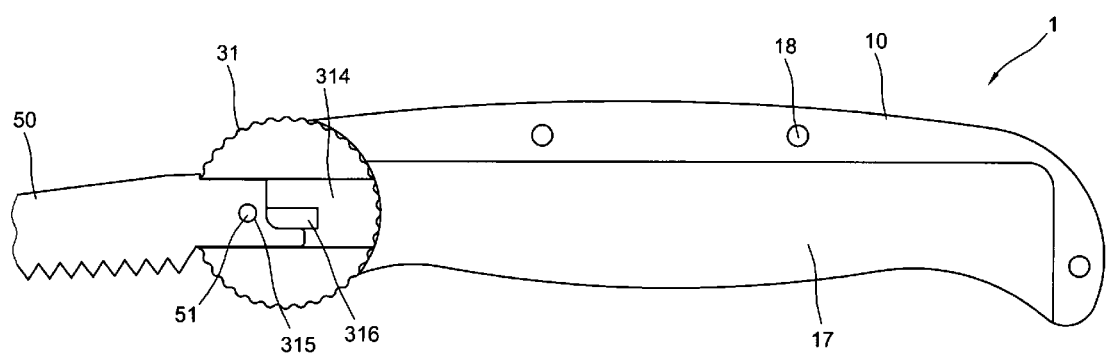
FIG. 7 is a plane view to show that the rear end of the saw blade is held by the retaining rod and the rectangular protrusion.
Figure 11:
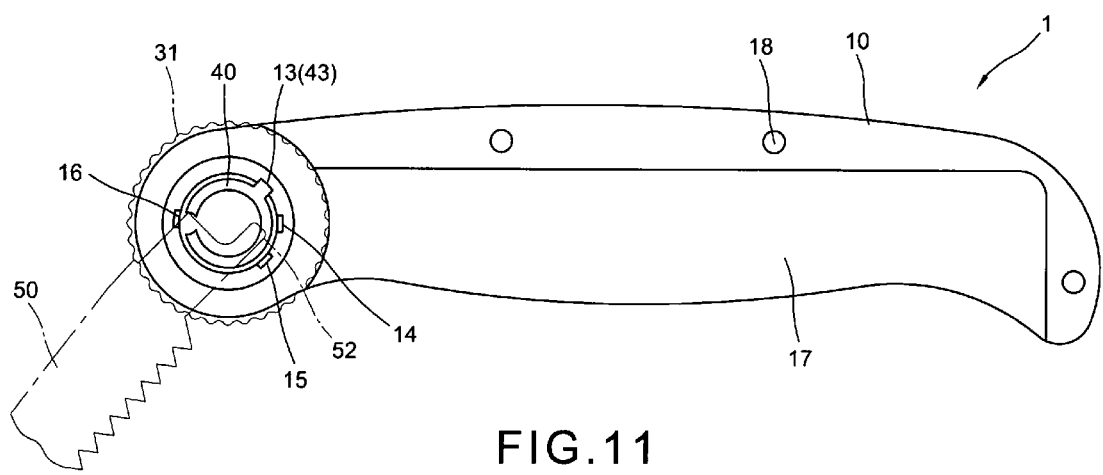
FIG. 11 is a plane view to show that the saw blade is turned a certain angle relative to the handle.

Referring to FIGS. 5, 6 and 7, when turn the saw blade 50 to a predetermined angle relative to the handle 1, press the pressing cap 42 inward to disengage the detent 43 with any of the four positioning grooves 13, 14, 15 and 16 so as to enable the circular clamping plate 30 to rotate about (note that whatever the detent 43 is engaged or disengaged with the positioning grooves 13, 14, 15 and 16, the turning member 40 is always engaged with the circular groove 313 of the circular clamping plate) to simultaneously lead the saw blade 50 and the turning member 40 to rotate a certain angle relative to the handle 1. Then release the pressing cap 42, the detent 43 will automatically engage with one of the four positioning grooves 13, 14, 15 or 16 (supposedly in the groove 14). Thus, the detent 43 can be also engaged with the positioning groove 15 to form another angle for the saw blade 50 (as shown in FIG. 11).

Figure 8:
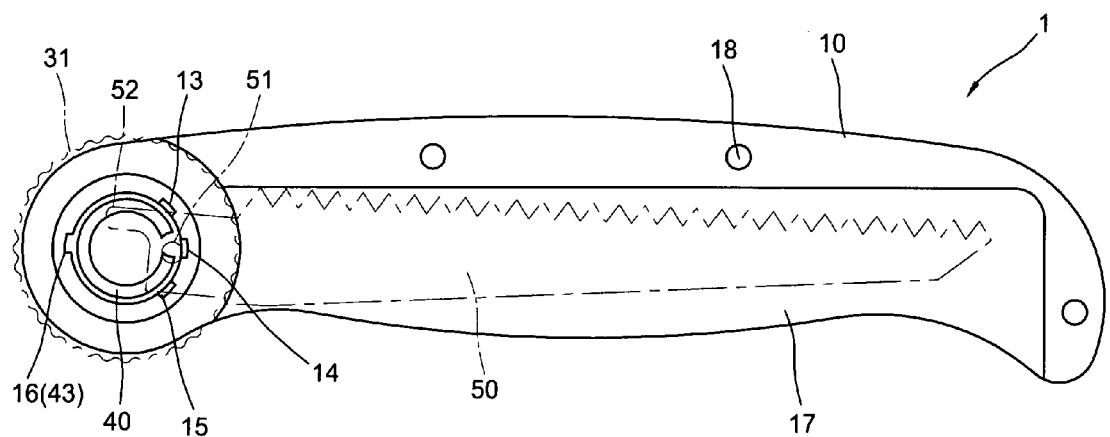
FIG. 8 is a plane view to show that the saw blade is bent over to be received in place into the handle.
Figure 9:
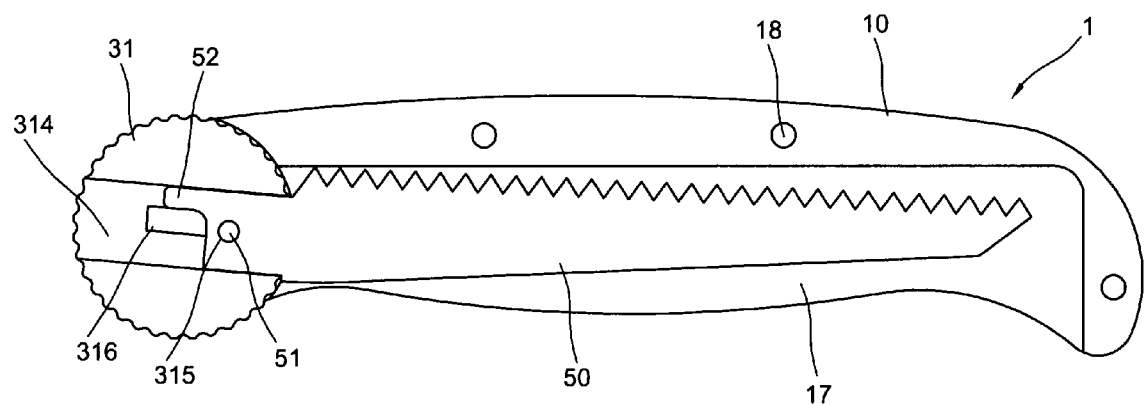
FIG. 9 is a plane view to show that the circular clamping member is turned for about 180 degrees.
Figure 10:
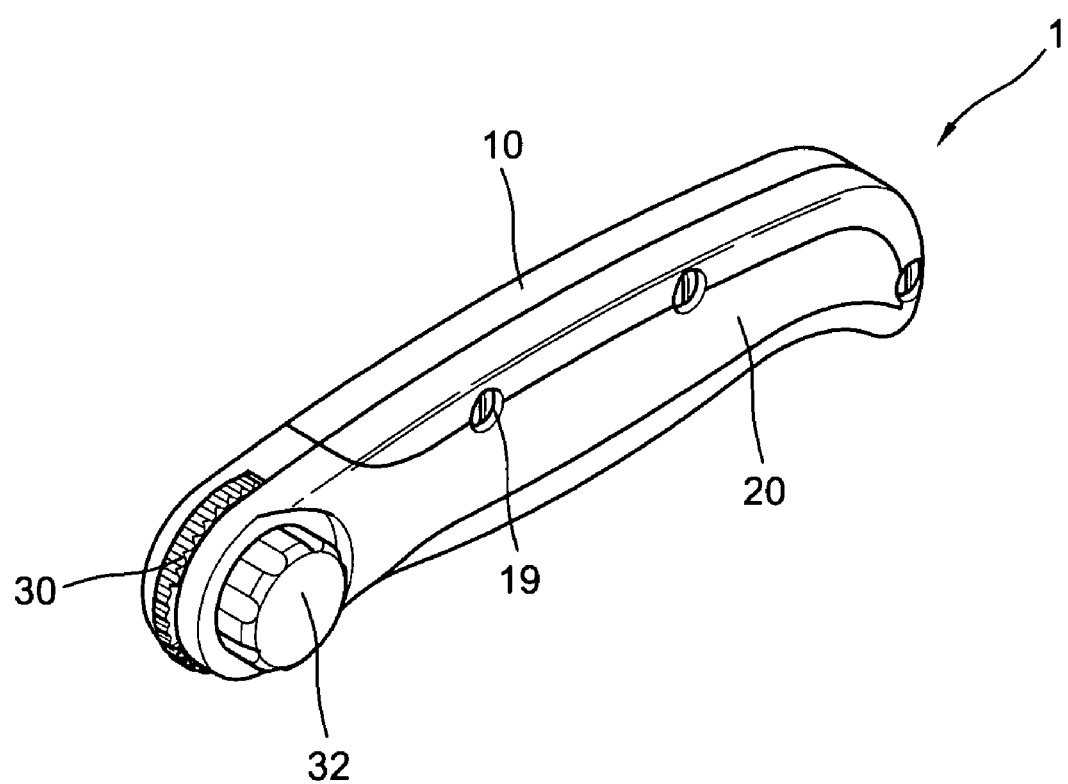
FIG. 10 is a perspective view to show that the saw blade is received in place into the handle.

Referring to FIGS. 8, 9 and 10 of the drawings, if one tries to hide the saw blade 50 when is not in use, press the pressing cap 42 inward again and turn the circular clamping plate counterclockwise, the turning member 40 is rotated simultaneously until that the detent 43 engages with the positioning groove 16, the saw blade 50 is already rotated for about 180 degrees and hid in the receiving space 17 of the first corresponding half 10 of the handle 1. Then release the pressing cap 42. The turning member 40 is checked from rotation.

Figure 4:
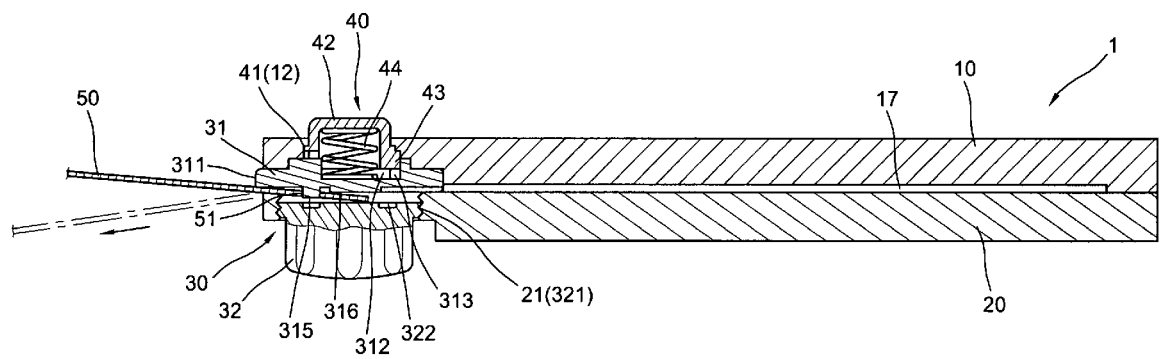
FIG. 4 is a sectional view to show that the saw blade is assembling into the angular adjustment device.

When removes the saw blade 50 from the angular adjustment device, conduct the reverse process as described in FIG. 4. Then the saw blade 50 is readily removed. The structure of the angular adjustment device of the present invention is suitable to other cutting blades which have the same inner distal structure as of the saw blade 50.

Further, the structure of the present invention provides a multi-stepped direct angular adjustment for the saw blade 50 and the saw blade 50 can be hid in the handle 1. Besides, it provides a convenient operation and rapid assembly and/or disassembly of the parts that is superior to the prior art as described the above which need a rotatable head on the front end of the handle, causing a structural complication and inconvenient operation.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A handsaw comprising:

a handle having a first and a second corresponding halves secured by a plurality of screws, wherein said first corresponding half has a first large circular hole formed in its front end which includes a protrudent ring and at least four positioning grooves spacedly formed in an inner periphery of the protrudent ring, and an elongate receiving space formed in the inner surface of the first corresponding half; said second corresponding half having a second large circular hole formed in its front end made in registry with the first large circular hole and threads in an inner periphery of the second large circular hole;

an angular adjustment device disposed in the front end of said handle between said first and second large circular holes having a hollow turning member rotatably disposed in the first large circular hole and including a pressing cap on a bottom of the turning member, a circular ring around an outer periphery of the turning member stopped against said protrudent ring and a detent on an outer periphery of the turning member abutting a rim of the turning member for selectively engaging one of said positioning grooves, a spring having a first end anchored into the rim of said turning member and a second end stopped against a circular clamping plate which has a striped circumference, a circular concave in a center of an inner side of the circular clamping plate for receiving the second end of said spring, a circular groove around said circular concave to engage with the rim of the hollow turning member, a diametric groove horizontally formed in an outer side opposite to the circular concave and including a retaining rod and a rectangular protrusion formed spaced apart thereon, a saw blade having a through hole at one end thereof for receiving said retaining rod and an extension beneath said through hole pressed against an underside of said rectangular protrusion, and a cup-shaped fastener having threads on an outer periphery thereof for engaging with the inner threads of said second large circular hole and for pressing against said circular clamping plate and said blade, and a circular groove formed in an inner surface engaged of the cup-shaped fastener for engaging with said retaining rod;

whereby, pressing said pressing cap inward and rotating about said circular clamping plate achieves an angular adjustment for said saw blade.

2. The handsaw as recited in claim 1, wherein said at least four positioning grooves have three of them positioned at a right side in said first large circular hole and a single one of them positioned at a left side thereof.

3. The handsaw as recited in claim 1, wherein said saw blade can be hid into said handle when is rotated for about 180 degrees.

* * * * *